April 28, 1970     LE ROY SUNDAY     3,508,557
PROCESS AND APPARATUS FOR HARVESTING BROOM CORN
Filed March 12, 1968     3 Sheets-Sheet 1
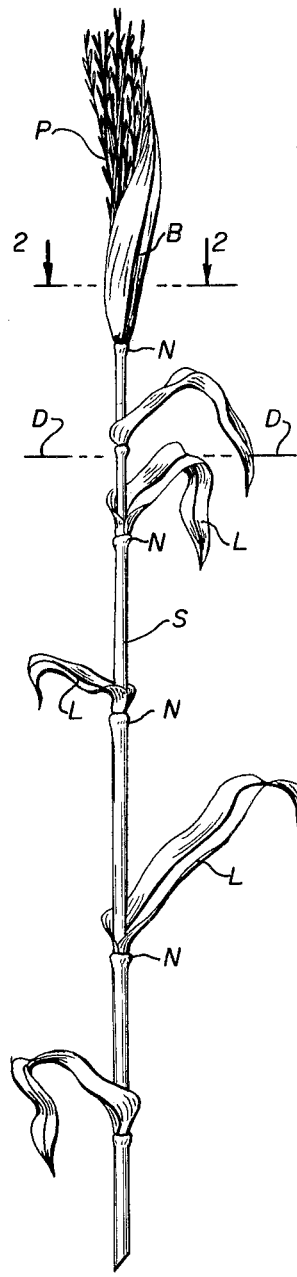
FIG. 1
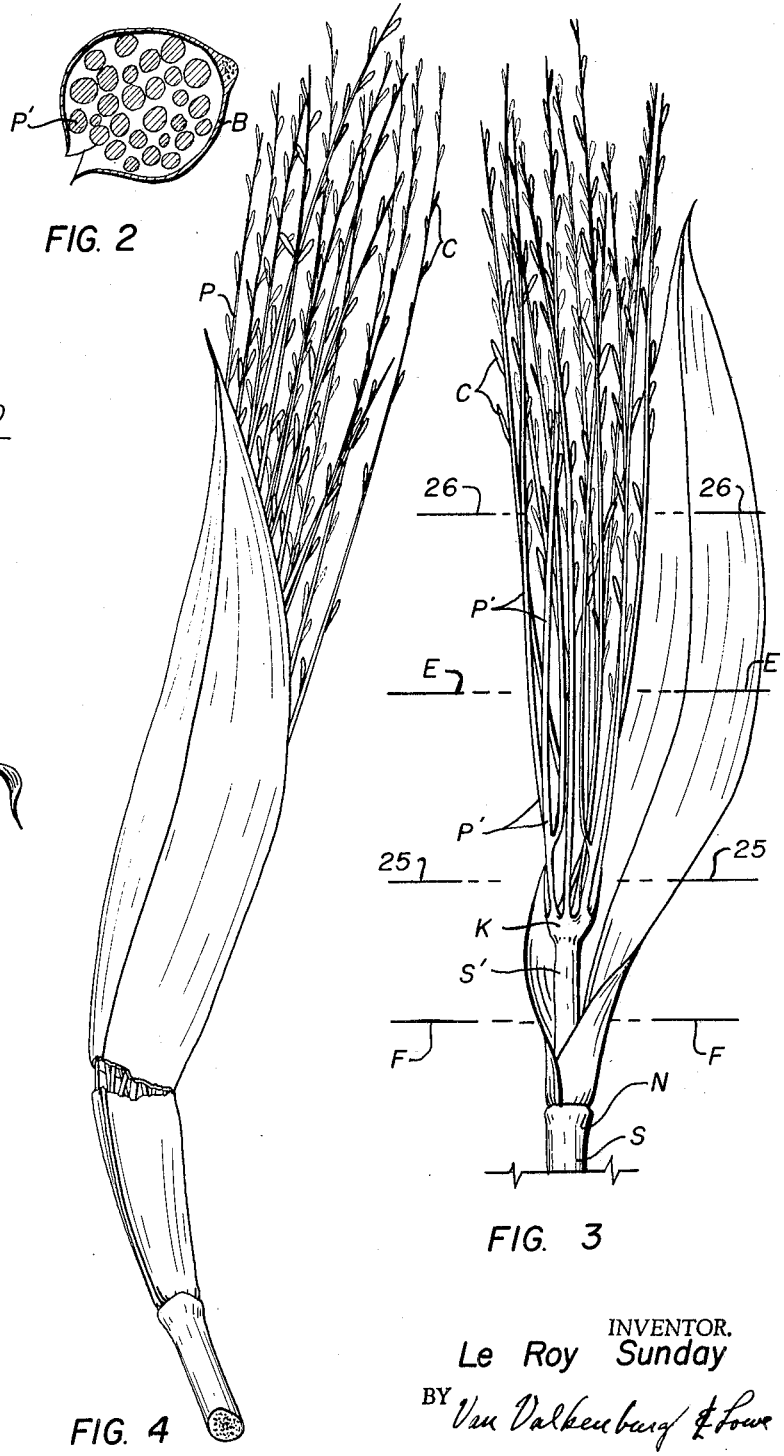
FIG. 2
FIG. 3
FIG. 4
INVENTOR.
Le Roy Sunday
BY *Van Valkenburg & Lowe*
ATTORNEYS

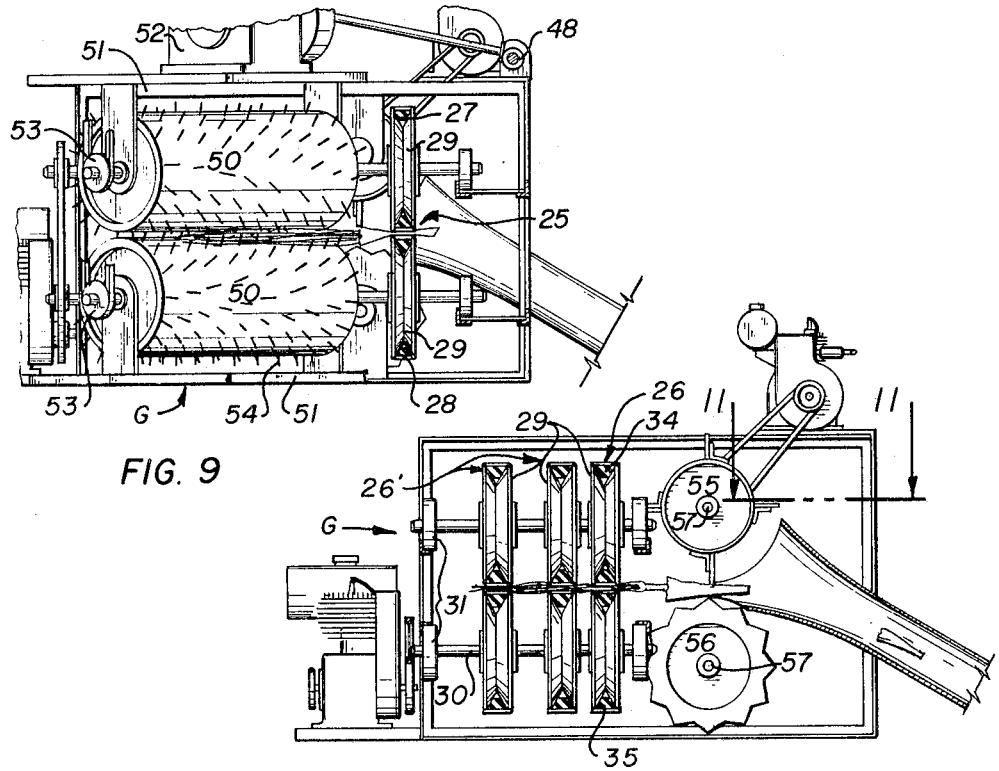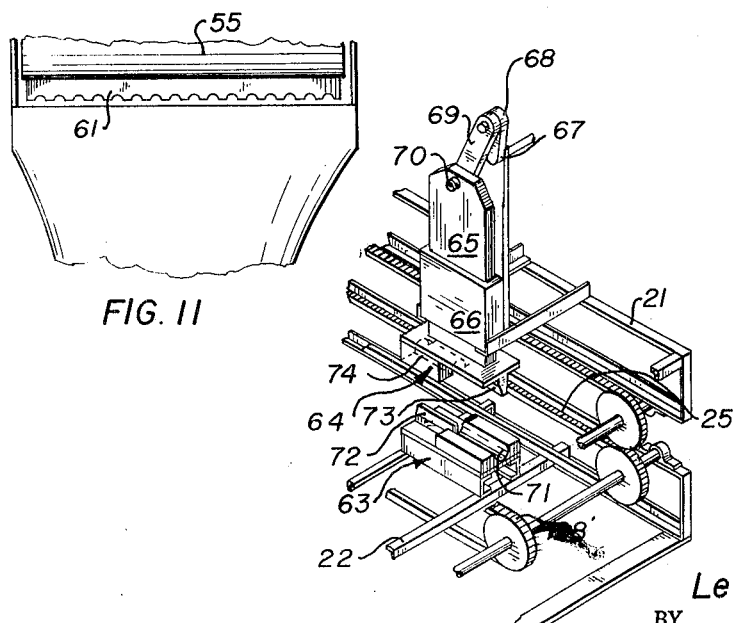

United States Patent Office 3,508,557
Patented Apr. 28, 1970

3,508,557
PROCESS AND APPARATUS FOR HARVESTING BROOM CORN
Le Roy Sunday, P.O. Box 31, Springfield, Colo. 81073
Filed Mar. 12, 1968, Ser. No. 712,476
Int. Cl. A01d
U.S. Cl. 130—30                                     15 Claims

ABSTRACT OF THE DISCLOSURE

The disclosure herein concerns improvements in methods and apparatus for harvesting and baling broom corn. The seed panicles of these plants form the broom straws, and the improved harvesting operations include drying these panicles to the point where the boot leaves, which ordinarily embrace the panicles, are sufficiently brittle as to permit them to be broken and easily removed from the panicles. After the plants are dried, but before the seed is removed from the panicle straws, a special thrashing or flexing operation is introduced, as with offset sprockets, to break the boot leaves in a manner which permits them to be easily stripped from the panicle.

---

This invention relates to the harvesting of broom corn and more particularly, to preparing the broom corn for baling and shipment to the factory.

As will hereinafter appear, the primary object of the present invention is to provide novel and improved methods and aparatus for the removal of undesirable boot leaves from the broom straws before these straws are baled.

Broom corn is an annual maize of the sorghum family. It grows as a single stalk to a height of from three to six feet. This stalk is topped by seed panicle, a group of stems, or straws, which extend from a knuckle joint at the top of the stalk. These stems, which are from twelve to twenty-four inches long when cleaned of seed and properly cured, become the straws for the manufacture of brooms. As such, the straws are the commercially valuable portion of the plant. Accordingly, after the stems are harvested in the fields, they are sorted, graded and baled for shipment to broom factories.

To describe the plant in further detail, the main stem is jointed in a manner typical of maize and it includes a joint a few inches below the knuckle at the top of the stem. This joint has an ensiform leaf which embraces and encloses the panicle above the knuckle and will not drop away from the panicle until the plant is fully mature. At that time, however, the panicle stems are no longer suitable for good broom straws.

At the stage of growth where the plant is ready for harvest, shortly before maturity, the boot leaf still tightly embraces the panicle. This boot leaf is a comparatively tough growth and it is rigidified by a longitudinally extended center ridge, a vein structure of the leaf, and with the blade of the leaf extending from each side of this vein to embrace the panicle. Therefore, in handling broom corn prior to baling it, one operation must be to get rid of the boot leaf. This is desirable and necessary because the factories which use the baled panicle straws for broom manufacture cannot economically remove the boot leaves. As a result, a bale of broom corn free of boot leaves will bring a substantially higher price than will a similar bale without the leaves removed.

In the past, broom corn has been harvested manually, usually by Indians living in the arid regions where it is grown, and these workmen will remove the boot leaf as they cut the panicle from the stalk. However, in recent years, there has been a substantial increase in labor cost and also, a general inavailability of laborers for this purpose. As a result, a number of attempts have been made to develop satisfactory broom corn harvesting machinery. It has been found that the broom corn in the field can be cut and bundled or windrowed with conventional machinery operating in a manner similar to ordinary corn harvesting machines. When the broom corn is brought to a central location for baling, it is moved past a knife which removes excess talk. It is then passed through a seeder of a type which holds the plant at the knuckle of the panicle while the stem portion is combed free of seeds as by opposing cylindrical toothed rollers. If it were not necessary to consider the boot leaves, the panicles could then be bundled or baled for shipment.

The seeder shreds the boot leaves into strips, but since the panicles are gripped at their knuckles, the boots are held in place. Boot shucking apparatus has been proposed. This usually consists of some type of opposing belts which hold the straws while resilient flaps strike the stems at the knuckles. Such apparatus is generally ineffective in removing the boot because the shredded ends of the boot leaves are held by the belts where the panicle straws are gripped.

The present invention was conceived and developed with the foregoing considerations in view and it is based upon the discovery that if the panicle is dried after it is harvested, preferably by artificial drying, the boot leaf will become brittle although the panicle straws remain supple. Accordingly, before the seeding commences, but after the panicle has been properly dried, the straws adjacent to the knuckle end may be flexed or flailed to break the boot leaf across its veins, and especially to break the central vein of the leaf. The seeding apparatus and a boot shucking apparatus can then effectively remove separate parts of the boot leaf.

It follows that another object of the invention is to provide, in the harvesting, seeding and baling of broom corn, the operation of drying the plant until the boot leaf becomes brittle so that thereafter, the panicles may be flexed or flailed to break the boot leaf to facilitate its removal.

Another object of the invention is to provide, in the harvesting of broom corn, an operation of drying the plants as soon as they are cut to not only facilitate the breaking and removing of boot leaves, but also to produce broom straws of improved quality and color.

Another object of the invention is to produce an apparatus for preparing broom corn for baling for shipment which includes a means for breaking the boot leaves of the plants and for thereafter, removing the broken fragments of the boot leaves.

Other objects of the invention include the provision of a novel and improved method for removing boot leaves from broom corn plants, and apparatus to supplement this method which is simple, effective and permits the use of ordinary harvesting machinery in handling the broom corn.

With the foregoing and other objects in view, all of which more fully hereinafter appear, the invention comprises certain steps, sequences and operations and construction, combinations and arrangements of parts as hereinafter described and defined in the appended claims and illustrated in the accompanying drawings in which:

FIGURE 1 shows, somewhat diagrammatically, a broom corn stalk at that stage of growth when it is suitable for harvesting and illustrating the boot leaf as partially embracing the panicle.

FIGURE 2 is a transverse section through the stock as taken from the indicated line 2—2 at FIG. 1, but on an enlarged scale and illustrating especially, the boot leaf embracing the panicle.

FIGURE 3 is an enlarged view of the head of the stalk, showing one side of the boot leaf as being pulled away from the panicle.

FIGURE 4 is another view of the head of the stalk, showing the manner in which the stalk is distorted to break the boot leaf after it is dried.

FIGURE 9 is a transverse elevational view of another section of the apparatus, as taken from the indicated line 9—9 at FIG. 6, but on an enlarged scale, with frame and cover members being removed to show the seeder rolls, and with a broom corn plant being held between gripping belts as it is being seeded.

FIGURE 10 is a transverse elevational view of yet another section of the apparatus as taken from the indicated line 10—10 at FIG. 6, but on an enlarged scale, with frame members being removed to better show boot shucking mechanisms and with a broom corn plant being held between gripping belts as the boot base is being removed.

FIGURE 11 is a fragmentary portion of the components shown at FIG. 10 as taken from the indicated line 11—11 at FIG. 10, but on an enlarged scale.

FIGURE 12 is a perspective view of an arrangement of mechanisms constituting a modified embodiment of certain portions of the components shown specifically at FIGS. 7 and 8, and illustrating a flailing unit which may be used to break the boot leaves as they commence moving through the apparatus.

Figure 5:
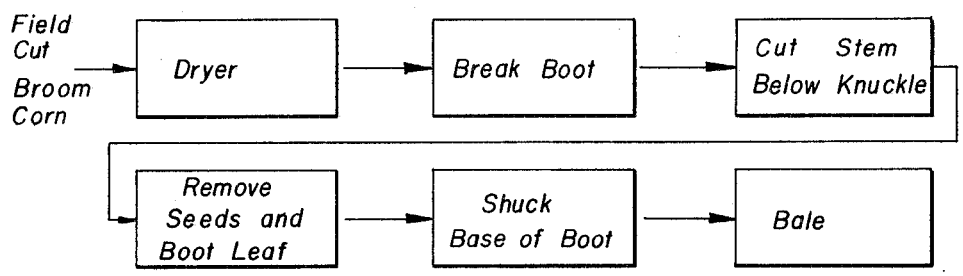
FIGURE 5 is a block diagram indicative of the steps required in the harvesting and preparing of broom corn for baling according to the present invention.

Referring more particularly to the drawing, FIG. 1 shows a broom corn plant growing as an upright stalk S with a seed panicle P being formed at the top of the stalk. The stalk S, characteristic of plants of this class, is formed as a single stem with spaced nodes N from whence the leaves L branch from the plant. A boot leaf B is formed at the top node N and during the development of the panicle and until the plant is fully mature, this boot leaf B embraces and ensheathes the panicle P as illustrated at FIGS. 1 and 2.

FIG. 3 illustrates in further detail the structure of the panicle P. A short stem S' extends above the top node N and terminates as a knob-like growth or knuckle K from whence the panicle stems P', the broom straws, extend with the seeds C of the plant being carried upon these straws P'. When ready for harvesting, the plant has attained its full height, the straws S their full length, but the seeds on the panicle P are not mature and the boot leaf B still embraces the panicle.

The steps of harvesting and preparing of these plants for shipment to a factory, according to the present invention, are indicated diagrammatically at FIG. 5. First, the plants are cut in the field. A conventional harvesting machine of any suitable type may be used to cut the plants in the field and this presents no problem since broom corn is planted as a row crop. The stalks are cut a foot or so below the top stem node N as at line D, of FIG. 1, to allow for variation of the height of the plants along a given row. The cut plants, which include an upper portion of the stem and the panicle, may then be windrowed or bundled in the field in any manner convenient for subsequent handling. They may also be field dried for a short period of time, but preferably, they will be picked up and transported to a dryer as will be described. Being cut before full maturity, the plant and the broom straws will be green in color and it is not desirable to dry them in the field to any appreciable extent, not only because the broom straws will bleach in the sun reducing their commercial value, but also, they will lose, to some degree, the toughness and suppleness which make the straws ideal for brooms.

Before drying the broom corn plants in a dryer, they may be run through a seeder to remove some of the bulk, but this operation is optional and thus need not be described. When placed in a dryer, the plants will lose a substantial proportion of the free moisture within them, and especially, the moisture within the boot leaf because the externally situated boot leaf is very thin. It was found desirable to remove, by drying, approximately 60 percent of the free moisture in the plant, but such criterion is not always available because of a considerable variation of the conditions of the broom corn in the field, from plants which have significant moisture to plants which are quite dry. A more simple and direct criteria of desirable dryness can be stated as that which is sufficient to render the boot leaf brittle. This discovery, that drying the plants to remove moisture, will render a tough, supple boot leaf brittle and frangible, permits a simple processing of the broom corn to remove the boot leaf as hereinafter described.

It was further ascertained that drying the broom corn in the field was usually inadequate to produce a brittle boot leaf. Variations of humidity and ambient conditions will cause variations in the dryness of the plants and there is always the risk of rain or even dew occurring which will naturally reduce the quality of the final product. Finally, an undesirable degree of bleaching can occur, as above mentioned. It is to be recognized, however, that under certain ideal natural conditions, such as an unusual spell of hot weather with extreme low humidity, a large percentage of the broom corn plants might be cut and air dried to the point where they can be processed by breaking the boot leaves as hereinafter described.

In the normal operations, however, after the plants are cut or as soon thereafter as is feasible, they are transported and placed in a drying compartment for artificial drying. Such a compartment may be the room of a building, but it has been found more convenient to use vehicles which can follow the harvesting machinery from one location to another. One type of such a vehicle is manufactured by the Continental Moss-Gordin Company of Alabama which has heretofore been used for drying peanuts and similar products after harvest and for purposes having no relation to the harvest of broom corn.

Such a vehicle was used in connection with the development of the present invention. It had a capacity of two and one-half tons of freshly cut broom corn in a single load. The drying operation in the machine was accomplished by maintaining a temperature within the vehicle of 125 to 150° F. as air was circulated through it, for periods of from six to twelve hours. It was found that freshly cut plants would easily dry to the point where the leaves were quite brittle and that very simple tests could be used to ascertain when the drying had progressed to the point where the plants were ready for further operations. In fact, an operator can quickly learn how to handle the broom corn and can tell by feel whether or not the broom corn stalks were sufficiently dry for boot breaking. Generally, it was found that a 5,000 pound load of freshly cut broom corn, when placed in the dryer for an eight-hour period, would lose approximately 2,000 pounds of water within the drying period and from this information, it is estimated that the plants lost as much as, or more than, approximately 60 percent of their free moisture.

Figure 6:
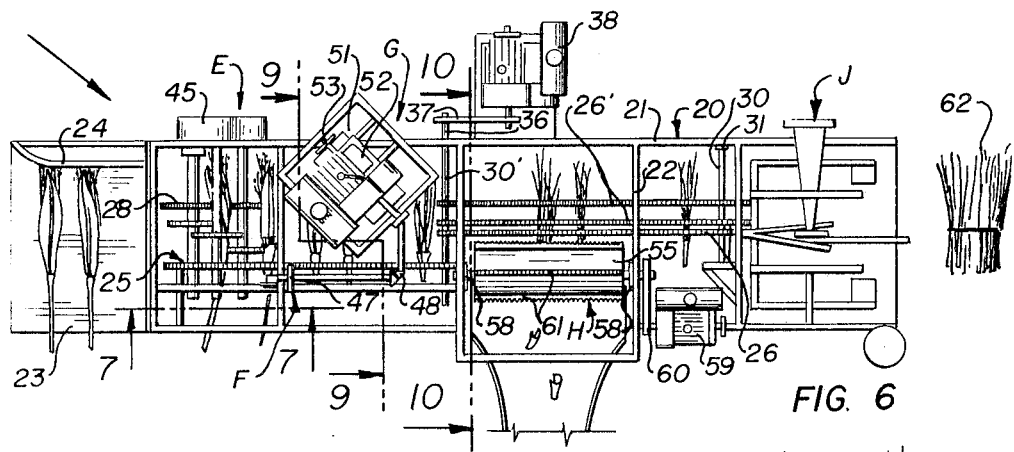
FIGURE 6 is a plan view, somewhat diagrammatical in nature, illustrating a preferred apparatus for use in the steps of booting, seeding and baling broom corn as it leaves the dryer.

The apparatus which receives the broom corn from the dryer may be formed as a single elongated machine arranged in the manner illustrated at FIG. 6. This apparatus is carried upon a suitable framework 20 having longitudinal, horizontal members 21 interconnected by transverse horizontal and vertical members 22 at suitably spaced positions. The framework 20 is only partially indicated in the drawing since it may be designed in various ways.

The broom corn panicles are adapted to move through this framework along a longitudinal path defined by opposing, gripping belts, hereinafter described, and the plants are held crosswise and horizontally in these belts with the tops at one side, and they retain this transverse position during their movement through the apparatus. Accordingly, it is necessary to feed the plants into the machine in a transversely disposed array with respect to their movement. This operation will require manual control at the infeed of the apparatus, but it will be comparatively simple because the broom corn plants are naturally harvested in this manner. First, they are bundled or windrowed in a regular array in the field. They are then loaded into the dryer in such bundles and may be unloaded from the dryer in the same manner to be fed into a receiving chute 23 which is either at the head of the apparatus illustrated at FIG. 6 or at the discharge of the dryer. This receiving chute 23 will be formed with a longitudinal wall 24 at one side thereof to permit the tops of the plants to be abutted against this wall so that all of the plants entering the machine will be in a uniform row with the tops even and the stems overhanging the edge of the chute opposite the wall 24. The wall 24 may be adjusted laterally to compensate for different size plants, however, it is contemplated that in the harvest of a field of broom corn, the plants will be comparatively uniform in height and that few adjustments by shifting of the wall 24 will be necessary once the machine commences to operate.

The harvesting apparatus consists of a number of components through which the broom corn panicles move and which include, sequentially, a boot breaker E, a steam cutter F, a seeder G, a boot shucker H and a bale tying apparatus J. The gripping belts to convey the broom corn past these components include a first reach 25 which is adapted to grip the panicle at the stems P immediately above the knuckle K as at the indicated line 25—25 at FIG. 3. This first reach carries the plants past the boot breaker, stem cutter and seeder. A second reach of gripping belts 26 is adapted to grip the upper portions of the panicle stems P', as at the indicated line 26—26 at FIG. 3, to carry the plants past the boot shucker and thence, to the bundle tying machine J.

Figure 7:
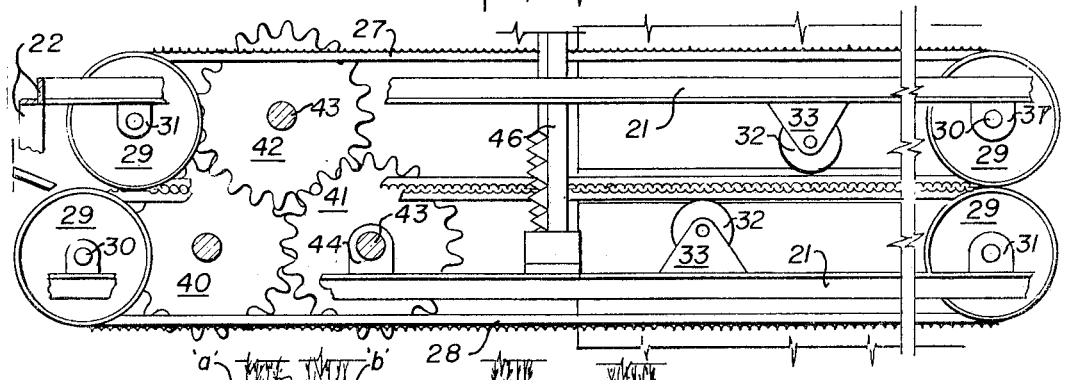
FIGURE 7 is a side elevational view of one section of this apparatus, as taken substantially from the indicated line 7—7 at FIG. 6, but on an enlarged scale and with portions of the frame and other elements being broken away to show constructions otherwise hidden from view.

The first set of gripping belts 25 is formed as a continuous upper belt 27 and an opposing, contacting lower belt 28. Each belt is mounted between pulleys 29 which, in turn, are carried upon shafts 30 mounted in bearings 31 secured to suitable frame members 21. The outer surface of each belt may be corrugated as indicated at FIG. 7 to provide a roughened gripping surface where the belts come together and if desired, the outer surface of one or both of these belts may include upstanding spikes to better extend through the panicle straws to hold the stems at the knuckles against the pull of the seeder when the plants pass through it. The contacting bottom reach of the upper belt and the top reach of the lower belt are necessarily held together through their entire reach to retain a grip on the plants. This is accomplished by any suitable guides or by an array of opposing guide wheels 32 spaced along the reach of the belts. Two such wheels 32 are illustrated at FIG. 7 and are mounted upon suitable bearings 33 which are, in turn, secured to the frame members 21, but other wheels, not shown, are also provided.

The second set of gripping belts 26 is illustrated as a plurality of units at FIGS. 6 and 10 and each includes a continuous upper belt 34 and lower belt 35. Each belt is mounted between pulleys 29 which are carried upon shafts 30 mounted in bearings 31 which, in turn, are secured to suitable frame members 21 the same as heretofore described. Since this second set of gripping belts is a continuation of the first set, the terminal end of the first belt 25 and the initial end of the second belt 26 may be carried upon a common shaft 30'.

Also, the outer surface of each belt of the second set is formed of a rubber-like material which is adapted to effectively grip the panicle stems P' to hold the plants against the pull of the boot shucking machine as the plants pass through it. These surfaces may be roughened or corrugated to facilitate this gripping effect. Likewise, the contacting bottom reach of the upper belt and top reach of the lower melt are necessarily held together through the entire reach to retain a grip on the plants and this may be accomplished by guides such as the guide wheels 32 heretofore described.

To better hold these plants in a horizontal alignment, table sections, not shown, may be provided at the level of the path between the upper and lower belts, or preferably, additional belt sections may be provided. An auxiliary lower belt reach 28' may be mounted at the boot breaker section whereon the upper portion of the panicles rest and auxiliary gripping belts 26' may be provided at the boot shucking reach of the apparatus, as illustrated.

The belts 25 and 26 and the auxiliary belts are all geared together to move in unison so that the plants will move through the machine in a regular procession. These belts are driven by any suitable motorized means which is connected to one or more of the shafts 30. In the illustration at FIG. 6, the shaft 30' which is common to belts 25 and 26, includes an extension 36 at one side of the apparatus which carries a belting system 37 which, in turn, is secured to a motor 38. This motor 38 may be of any suitable type such as an internal combustion engine or an electric motor. The gearing is arranged to provide a desired velocity of the belts in the neighborhood of approximately one foot per second.

The boot breaking apparatus E must either flex or flail the plants to rupture the boot B in the section between where the gripping belts 25 grip the plant, at the knuckle, and where the gripping belts 26 grip the straws, as for example, in a region of the line E—E at FIG. 3. In this manner, the upper portion of the boot leaf is combed away when the plant passes through the seeder G and thereafter, the lower portion of the boot is brushed away by the boot shucker H when the plant is held by the gripping belts 26.

Figure 8:
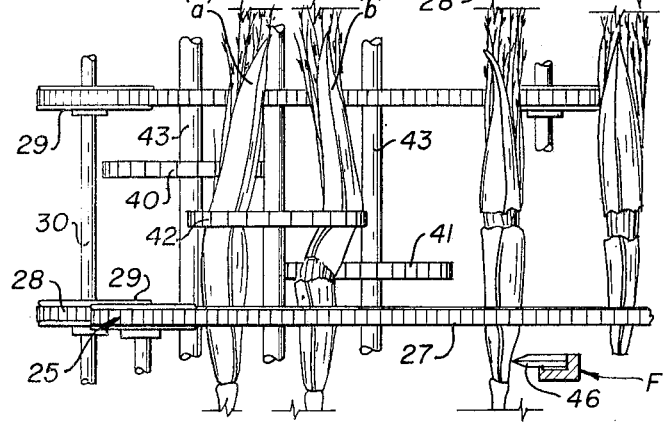
FIGURE 8 is a plan view of certain operative components of the apparatus illustrated at FIG. 7 and illustrating also, a few broom corn plants therein to better show the manner in which the heads are flexed to break the boot leaves and the manner in which the plant stems are cut away from the panicles.

FIGURES 6 through 8 illustrate an apparatus wherein the plants are flexed. This apparatus is formed as a triad of sprockets including two lower sprockets, a leading sprocket 40 and a trailing sprocket 41, and an upper, intermediate sprocket 42. These sprockets are mounted upon shafts 43 which are, in turn, carried in bearings 44 secured to the structural framework and with a suitable driving mechanism 45 at one side of the apparatus which is timed to rotate the sprockets in unison with the belt movement.

In plan, these sprockets are positioned adjacent to the gripping belt set 25, however, each is offset a short distance from the other, with the leading sprocket being the furthest from the belt set 25, the intermediate sprocket 42 being next, and the trailing sprocket 41 being closest to the belt set.

In elevation, the lower sprockets reach upwardly a short distance above the belt contact line while the upper sprocket extends a short distance below the belt contact line so that there is a lapping of teeth of the upper and the lower sprockets as in the manner illustrated at FIG. 7. The teeth of the sprockets are of a comparatively large pitch and large enough to easily accommodate a number of broom straws P' within each tooth socket. Accordingly, when the broom corn panicles are gripped by the belts 27 and 28 and move into the sprockets, there is first a gripping by the forward and intermediate sprockets 40 and 42. This produces an upward flexing of a broom corn panicle in a forwardly direction as indicated by 'a' at FIG. 8. Next, there is a gripping by the intermediate and rear sprockets 42 and 41. This produces an upward and rearward flexing of the panicle in substantially the opposite direction as indicated by 'b' at FIG. 8. This is a double flexing action, bending the panicles in substantially opposite directions, and this action assures a proper breaking of the boot leaves and especially, a breaking of the central veins thereof. The breaking is assured regardless of the position of the boot leaf. This is necessary because the plants moving into the apparatus will be oriented in a random manner, and the central stem of a boot leaf may be at any position about the stem with respect to the direction of movement.

As the plants are gripped between the belts 27 and 28 and move past the boot breaker E, they contact the stem cutter F. This cutter F is located closely adjacent the belt set 25 at the side opposite the panicle and it functions to cut each plant at its stem portion S' above the node N and below the knuckle K, as along the line F—F at FIG. 3. In this manner, the cut completely severs the boot leaf from its connection with the stem and provides a short portion of the stem S' which is desirable in the final baling of the product. This cutter can be of any suitable type, such as a sickle bar 46 oriented vertically to present the sickle knives to the oncoming plant stems. The sickle bar 46 is oscillated by a crank mechanism 47 which, in turn, is connected to a drive 48 of the seeder motor, hereinafter described.

As the plants leave the cutter F, the heads are fed into a seeder G. This seeder, which is a conventional unit, is formed as a pair of cylindrical drums 50 which are oriented, one above the other, and above and below the belt contact level and at an inclination with respect to the adjacent belt set 25. The seeder is housed within upper and lower box-like containers 51 and is driven by a suitable motor 52 which is mounted upon the upper container. Drive mechanisms 53 extend from the motor to the drums and rotate the drums at a rate which is correlated to the rate of movement of broom corn stalks passing through the seeder. The drums include arrays of outstanding pins or teeth 54 which are adapted to comb through the broom straws as the drums rotate. It is to be noted, however, that this combing action not only removes seed from the straws, but also removes the upper portion of the broken boot leaf leaving the panicle straws P' clean and free of extraneous materials.

As the plants leave the seeder, they are released from the first belt set 25 and gripped by the second belt set 26 and its parallel auxiliary belts 26' which, as heretofore stated, grip the outer portion of the cleaned panicle straws. The plants are then moved past the boot shucker apparatus G. This apparatus is formed as an upper cylindrical drum 55 and a lower drum 56, above and below the belt contact level so the plants move between the drums. The drums have their axes subtantially parallel to the reach of the gripping belt set 26 and are positioned closely alongside this belt set to strike the base of the panicle in the region of the knuckle K.

These drums are mounted upon suitable shafts 57 which are carried in bearings 58 mounted upon the framework 21 and each shaft is operatively connected to a drive motor 59 as by pulley-belt arrangement 60 illustrated generally at FIGS. 6 and 10. The lower drum 56 is formed as a cylindrical member having a corrugated surface which strikes and, in effect, bounces the ends of the stems. The upper drum 55 is of a smaller diameter and this cylindrical member is carried several inches above the level of the stems. However, it is provided with a circumferential array of outstanding longitudinal flaps 61 having serrated or notched edges which are sized to grip portions of the stems moving therepast. The action of the flaps is to rapidly strike the lower ends of the plants with the serrated or notched edges partially embracing the stems and to thereby knock the lower portion of the boot leaves off the plants so that the panicles are effectively cleaned.

The cleaned, trimmed panicles move from the booter and are discharged into the bale tying apparatus J to provide bundles or bales 62 as illustrated somewhat diagrammatically at FIG. 6. This bale tying apparatus may be one of any of several conventional types and hence, need not be further described.

As heretofore mentioned, the boot breaking operation may also be accomplished by flailing, that is, by a device which simply strikes the base of the broom corn head a sharp blow with or without flexing the plant to any substantial degree. Thrashing flails, rods oriented in the direction of movement of the plants, which rapidly strike the plants crosswise, may serve the purpose. A preferred flail, however, is shown at FIG. 7 which combines a striking action with a moderate degree of flexing of the stems. This flail E' is mounted in the same location as heretofore described for the sprockets, closely alongside the belt set 25. It includes an anvil structure 63 which extends below the belt gripping surface at the plant level and a hammer 64 mounted above this belt gripping surface. The hammer 64 is mounted upon a vertically extended bar 65 which is reciprocably retained in a sleeve 66 secured to a frame member 21.

A drive mechanism is mounted upon the frame member 21 above the bar 64. This drive includes a shaft 67 carried in a bearing in an extension of the sleeve 66, and is connected to any suitable driving means not shown. The shaft carries a crank 68. A connecting rod 69 connects the crank with a pin 70 on the bar 65 so that rotation of the shaft 67 will reciprocate the bar 64. Accordingly, the hammer reciprocates immediately above or against the anvil depending upon the pressure to be exerted upon the broom corn plants by the striking action.

The structure of the anvil and hammer may be in various forms. However, one preferred arrangement provides a first section of the anvil 63 with a longitudinal groove 71 and a second section with a longitudinal ridge 72 in alignment with the groove. The hammer 64 is formed in a reverse manner, having a first section with a longitudinal ridge 73 which is above the anvil groove 72, and the second section having a longitudinal groove 74 which is above the anvil ridge 73. The grooves 71 and 74 are much wider than the complementary ridges 72 and 73 respectively, and the height of the hammer with respect to the anvil is such that the plants will flex upwardly when they are struck by the ridge 73 of the hammer and moved against the groove 71 of the anvil, and will then flex downwardly when they are struck by the groove 74 of the hammer and moved against the ridge 72 of the anvil.

Regardless of the type of flail used, it is contemplated that it may include resilient components so that the broom straws will not be crushed and in the arrangement above described, the hammer or anvil, or both, may be formed of blocks of resilient rubber or similar material.

As an example of an operation using the present invention, a 5,000 pound load of freshly cut broom corn was placed in a Moss-Gordin dryer and thereafter, heated to a temperature slightly above 125° F. for an eight hour period and a weight loss of approximately 2,000 pounds was noted. Subsequently, the broom corn was removed from this dryer and fed into the chute 23 with the heads all being oriented in one direction and against an alignment wall 24 so that they moved into the apparatus as a uniform array. Practically all of the boot leaves of these plants were still tightly embracing the panicle straws. However, as they passed between the sprocket rolls 40, 41 and 42, these boot leaves were broken apart and fully ruptured as the sprockets flexed the plants. Thereafter, the stems of the plants were cut by the cutter F as they were held between the first belt set 25. The plants then moved through the seeder rolls cleaning the upper portion of the broom straws of seeds and the upper portions of the boot leaves.

Thereafter, the plants were then gripped by the second set of belts at the cleaned straw portions and moved past the boot shucking rolls which removed the lower ends of the boot leaves. The cleaned broom straws were then debaled and transported to a warehouse for ultimate shipment. It was found that this operation eliminated at least 99 percent of the boot leaves and portions thereof providing clean broom corn straws which were sold at a premium price.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. In the process for harvesting, cleaning and preparing a broom corn panicle, the steps subsequent to cutting of the plant at the stem below the panicle and preparatory to baling cleaned panicle straws for shipment, including:
   (a) drying the broom corn plant to remove moisture and render brittle the boot leaf embracing the panicle;
   (b) breaking the boot leaf across the panicle straws to provide an upper portion and a lower portion thereof;
   (c) severing the plant between the panicle knuckle and the boot leaf node to dispose of the stem and to release the lower portion of the boot leaf from the stem;
   (d) gripping the lower portion of the panicle adjacent to the knuckle and removing seed from the panicle straws and concurrently therewith, removing the upper portion of the boot leaf; and
   (e) gripping the upper portion of the panicle straws and removing the lower portion of the boot leaf.

2. In a process for cleaning and preparing broom corn straws for shipment, including the steps of:
   (a) drying a broom corn panicle cut from a plant to remove moisture and to render the boot leaf embracing the panicle brittle;
   (b) breaking the boot leaf across the panicle straws to provide an upper and lower portion thereof; and
   (c) removing the boot leaf portions.

3. In the process defined in claim 2, wherein the boot leaf is broken by flexing.

4. In the process defined in claim 2, wherein the boot leaf is broken by flexing back and forth.

5. In the process defined in claim 2, wherein the boot leaf is broken by flailing.

6. In the process defined in claim 2, wherein the broom corn plant is dried in an artificial environment having a temperature within the approximate range of 125° to 150° F. and for a period approximating 8 to 12 hours.

7. In the process defined in claim 2, wherein the plant is dried to a point where it loses more than approximately 60 percent of its moisture.

8. In an apparatus for cleaning and preparing broom corn panicle straws for shipment, from broom corn which has been cut at the stems below the panicles and thereafter dried, to the point where the boot leaves embracing the panicles are brittle, and including:

(a) a first gripping means adapted to grip the broom corn panicle at the base of the straws adjacent to the knuckle, and to move the plant along a longitudinally disposed path and oriented substantially transversely to the path;
   (b) a means interposed in said path adapted to disrupt the panicle near the point of gripping to an extent sufficient to break the boot leaf into an upper portion and a lower portion;
   (c) a cutoff means interposed in said path adapted to sever the stem between the panicle knuckle and the boot leaf node, to dispose of the stem and to release the lower portion of the boot leaf from the stem;
   (d) a seeding means interposed in said path adapted to remove seeds from the panicle straws and, at the same time, remove the upper portion of the boot leaf;
   (e) a second gripping means adapted to grip the upper portion of the cleaned straws of the panicle, as the first gripping means releases the lower portion thereof; and
   (f) a means adapted to remove the lower portion of the boot leaf while the straws are being held by the second said gripping means.

9. In the apparatus defined in claim 8, wherein the panicle disrupting means includes a means adapted to flex the plant at the panicle straws.

10. In the apparatus defined in claim 8, wherein the panicle disrupting means includes sprockets interposed above and below said path, with the toothed portions lapping sufficiently to grip and flex the panicles as they move past the sprockets.

11. In the apparatus defined in claim 8, wherein the panicle disrupting means comprises a flail.

12. In the apparatus defined in claim 8, wherein the panicle disrupting means comprises an anvil at one side of said path and a hammer at the opposite side thereof, adapted to strike the plants as they move above the anvil.

13. In the apparatus defined in claim 12, wherein at least one of said members is formed of resilient material.

14. In the apparatus defined in claim 8, wherein said means adapted to remove the lower portion of the boot leaf comprises a flap adapted to strike the plant adjacent to the base of the panicle.

15. In the apparatus defined in claim 8, wherein the means adapted to remove the lower portion of the boot leaf comprises a roll underneath said path having its axes substantially in the direction of the path and a flapping means above the plant adapted to strike the base of the plant as it is upon the roll.

References Cited

UNITED STATES PATENTS

| | | | |
|---|---|---|---|
| 1,064,617 | 6/1913 | Cory | 130—30 |
| 1,149,281 | 8/1915 | Palladay | 130—30 |
| 2,599,143 | 6/1952 | Thompson | 56—17 |
| 2,699,030 | 1/1955 | Adamson | 56—54 |

ANTONIO F. GUIDA, Primary Examiner

U.S. Cl. X.R.

56—54